Patented Apr. 5, 1938

2,113,381

UNITED STATES PATENT OFFICE 2,113,381

EXTENDED ZINC PIGMENT

James B. Nichols, Wilmington, Del., assignor, by mesne assignments, to E. I. du Pont de Nemours and Company, a corporation of Delaware No Drawing. Application July 1, 1935, Serial No. 29,380

6 Claims. (Cl. 134—78)

The present invention relates to pigments in which a zinc pigment of high refractive index, for instance greater than about 2.0, is combined with an extender, the refractive index of which is less than about 1.44.

The zinc pigments to which this invention relates are zinc oxide, zinc sulfid and the lithopone pigments derived from zinc sulfid, which have refractive indices as follows:

ZnO:2.015 and ZnS:2.36

The figures of refractive indices as given herein are taken from the literature, as for instance the International Critical Tables, or are calculated from published data according to the method described on page 1013 of the second volume of Tutton's Crystallography (2nd Edition 1922) MacMillan & Co., London.

In blending or otherwise combining such zinc pigments with extenders of a refractive index below 1.44 I obtain a remarkable and unexpected increase in the hiding power of the blends when compared with blends which contain an extender of a refractive index greater than 1.44.

Most extenders of extremely low refractive index, the use of which are contemplated in my invention, are fluorine compounds as exemplified by the following:

| | Refractive index |
|---|---|
| Sellaite (magnesium fluoride $MgF_2$) | 1.382 |
| Villiaumite (sodium fluoride NaF) | 1.336 |
| Sodium silicofluoride ($Na_2SiF_6$) | 1.299 |
| Chiolite ($2NaF.AlF_3$) | 1.347 |
| Cryolite ($3NaF.AlF_3$) | 1.364 |
| Magnesium silicofluoride ($MgSiF_6.6H_2O$) | 1.349 |
| Pachnolite ($NaF.CaF_2.AlF_3.H_2O$) | 1.413 |
| Calcium fluoride ($CaF_2$) | 1.434 |

For purpose of comparison I am giving in the table below the refractive indices of various commonly used pigment extenders:

| | Refractive index |
|---|---|
| Blanc fixe ($BaSO_4$) | 1.64 |
| Anhydrite ($CaSO_4$) | 1.586 |
| Gypsum ($CaSO_4.2H_2O$) | 1.524 |
| Calcium carbonate ($CaCO_3$) | 1.601 |
| Barium carbonate ($BaCO_3$) | 1.627 |
| Quartz ($SiO_2$) | 1.547 |
| $MgO.SiO_2$ | 1.655 |
| $2MgO.SiO_2$ | 1.652 |
| $3MgO.3SiO_2.2H_2O$ | 1.501 |
| Talc | 1.572 |
| Kaolinite ($Al_2O_3.2SiO_2.2H_2O$) | 1.564 |
| Pyrophyllite | 1.580 |
| Sillimanite | 1.644 |

It will be seen from this table that the refractive indices of these minerals which have been or may be used as pigment extenders are substantially greater than 1.44.

The cost of a blended pigment to be used in formulating a coating composition of the desired opacity or covering power is not solely dependent upon the cost per unit weight of the various pigments and extenders employed, but depends upon the actual cost per unit of covering or hiding power obtained in the coating compositions.

In the art it is common practice to decrease the cost of the unit hiding power by diluting the prime pigment with cheaper extenders, such as for instance calcium or barium sulfate, or others.

I have found that a considerably increased hiding power per unit of prime pigment is obtained if the refractive index of the extender is extremely low, for instance less than 1.44.

The greater unit covering or hiding power obtained by the use of extenders according to my invention is due to a number of factors, including particle size relationship, but is particularly dependent upon the relationship between the refractive index of the prime white pigment and that of the extender.

I have found that for blended pigments the difference between the refractive index of the pigment and that of the extender should be as great as possible.

In evaluating the new extenders, I have used several methods by which the hiding or covering power of my blended pigments was measured and compared with pigments containing extenders of a refractive index substantially greater than 1.44.

To illustrate my invention I shall describe various formulations as follows:

Several pigments were made by dry blending zinc sulfid with calcium fluoride in the ratio of 28.5 parts by weight of zinc sulfid and 71.5 parts of calcium fluoride.

In order to compare the effect of calcium fluoride with that of a common extender, similar blends were made in which the low refractive extender was replaced by an equal quantity of barium sulfate. In these evaluations, two different samples of zinc sulfid were blended in turn with three different grades of barium sulfate. The paints used for making the hiding power comparisons were all made in the same manner and were tested under the same conditions, using the Ffund cryptometer. The hiding power data given below were calculated in terms of the number of square feet of coverage per pound of zinc sulfid.

| Pigment | Hiding power (square feet/pound) |
|---|---|
| ZnS (A)+$BaSO_4$ A<br>ZnS     +$BaSO_4$ B<br>ZnS     +$BaSO_4$ C | 25.1 (average) |
| ZnS (B)+$BaSO_4$ A<br>ZnS     +$BaSO_4$ B<br>ZnS     +$BaSO_4$ C | 23.5 (average) |
| ZnS (A)+$CaF_2$ | 30.9 |
| ZnS (B)+$CaF_2$ | 30.3 |

The above values show that an improvement in hiding power of over 23% for the zinc sulfid of sample A and about 29% for the zinc sulfid of sample B was obtained by using the low refractive index calcium fluoride in place of the barium sulfate of higher refractive index.

As the various barium sulfate samples used differ widely in their hiding power developing capacities relative to zinc sulfid, the average values obtained have been used. However, in no case did the barium sulfate extended pigments approach the calcium fluoride blends in developed hiding power. No particular effort was made in the case of the above blends to use a calcium fluoride of the optimum particle size range to insure maximum obtainable hiding power.

Similar improved hiding power values are also obtained when zinc sulfid-calcium fluoride blends are compared with lithopones of the same zinc sulfid content.

When blending pigment zinc oxide with extenders of a refractive index less than 1.44, one also obtains pigments which are of a higher hiding power than blends containing an equivalent amount of zinc oxide and an extender of a refractive index substantially greater than 1.44.

The extenders of extremely low refractive index, namely less than 1.44, may be associated with the pigment zinc oxide and zinc sulfid in any of a number of ways, including simple mixing, wet mixing, wet grinding, dry grinding and by other mixing or blending processes.

As no special effort was made to insure optimum particle size distribution to obtain maximum hiding power, it can readily be seen that my invention is not limited to the use of extenders of any particular particle size characteristics. The maximum size is, however, limited by the amount of large particles, or grit, that would be objectionable in the final coating composition. The minimum size is limited by the cost of the processing necessary to secure this size.

A number of extender materials which were employed in this work were naturally occurring minerals. I do not imply that my invention is limited to the use of processed natural minerals but includes synthetic materials as well. In certain cases such materials may be less expensive than natural minerals which have to be processed in order to meet the requirements of color, purity, and particle size demanded of extenders for white pigments.

I further prefer to use the low refractive index materials which have a low solubility in water, such as calcium fluoride, magnesium fluoride, cryolite, etc.

Due to the wide application of zinc oxide and zinc sulfid pigments, and to the variety of hiding power requirements, I do not wish to set limits as to the amount of extender which is to be blended with the zinc pigment. In most instances, pigments of satisfactory hiding power will be obtained when a preponderant amount of extender, for instance from 60 to 75% by weight is blended with the zinc pigment; for different hiding powers, one will naturally vary the amount of zinc pigment in the blend.

My novel blends comprising a zinc pigment and an extender of refractive index less than 1.44 are used in the same manner in coating compositions as ordinary zinc oxide, zinc sulfid or lithopone pigments; they were, however, found to be most advantageously used in types of coating compositions which have a gloss finish such as enamels, house paints, etc.

I claim:

1. A non-coalesced composite pigment comprising a zinc pigment selected from the group consisting of zinc oxide and zinc sulfid, and a difficultly water soluble fluorine compound extender of a refractive index less than 1.44 said pigment being suitable for use in an opaque non-aqueous coating composition and when used in such a composition has a hiding power greater than that of a similar composition in which said low refractive index extender has been replaced by an extender of an index of refraction greater than 1.44.

2. A non-coalesced composite pigment comprising pigment zinc sulfid and a difficultly water-soluble fluorine compound extender of a refractive index less than 1.44 said pigment being suitable for use in an opaque non-aqueous coating composition and when used in such a composition has a hiding power greater than that of a similar composition in which said low refractive index extender has been replaced by an extender of an index of refraction greater than 1.44.

3. A non-coalesced composite pigment comprising pigment zinc sulfid and as a difficultly water-soluble fluorine compound extender an insoluble fluorine compound having a refractive index less than 1.44 said pigment being suitable for use in an opaque non-aqueous coating composition and when used in such a composition has a hiding power greater than that of a similar composition in which said low refractive index extender has been replaced by an extender of an index of refraction greater than 1.44.

4. A non-coalesced composite pigment comprising pigment zinc sulfid and a difficultly water-soluble fluorine compound extender selected from the group of fluorine compounds consisting of sodium fluoride, magnesium fluoride, calcium fluoride, sodium-aluminum fluoride, sodium-calcium-aluminum fluoride, sodium silicofluoride and magnesium-silicofluoride said pigment being suitable for use in an opaque non-aqueous coating composition and when used in such a composition has a hiding power greater than that of a similar composition in which said low refractive index extender has been replaced by an extender of an index of refraction greater than 1.44.

5. A non-coalesced composite pigment comprising pigment zinc sulfid and calcium fluoride said pigment being suitable for use in an opaque non-aqueous coating composition and when used in such a composition has a hiding power greater than that of a similar composition in which said low refractive index extender has been replaced by an extender of an index of refraction greater than 1.44.

6. A non-coalesced composite pigment comprising pigment zinc sulfid and calcium fluoride, said pigment having a hiding power greater than a similar pigment containing equivalent amounts of zinc sulfid and barium sulfate said pigment being suitable for use in an opaque non-aqueous coating composition and when used in such a composition has a hiding power greater than that of a similar composition in which said low refractive index extender has been replaced by an extender of an index of refraction greater than 1.44.

JAMES B. NICHOLS.